United States Patent [19]

Ford et al.

[11] Patent Number: 4,921,610
[45] Date of Patent: May 1, 1990

[54] CLEANING OF HOLLOW FIBRE FILTERS

[75] Inventors: Douglas L. Ford, Eastwood; Noel Barton, West Pymble, both of Australia

[73] Assignee: Memtec Limited, Parramatta, Australia

[21] Appl. No.: 236,711

[22] PCT Filed: Sep. 4, 1987

[86] PCT No.: PCT/AU87/00301
  § 371 Date: May 4, 1988
  § 102(e) Date: May 4, 1988

[87] PCT Pub. No.: WO88/01529
  PCT Pub. Date: Mar. 10, 1988

[30] Foreign Application Priority Data

Sep. 4, 1986 [AU] Australia .................. PH7847
Jan. 19, 1987 [AU] Australia .................. PH9928

[51] Int. Cl.⁵ ............................... B01D 13/00
[52] U.S. Cl. .................... 210/636; 210/321.69; 210/411

[58] Field of Search ........... 210/411, 409, 636, 140, 210/414, 321.69, 138, 139, 500.23

[56] References Cited

U.S. PATENT DOCUMENTS 4,332,264  6/1982  Gortz .................. 210/140 X
4,606,826  8/1986  Sano .................... 210/646

FOREIGN PATENT DOCUMENTS 4592185  8/1985  Australia .............. 210/85
8602858  5/1986  World Int. Prop. O. ..... 210/90

Primary Examiner—Frank Spear
Attorney, Agent, or Firm—Oblon, Spivak, McClelland, Maier & Neustadt

[57] ABSTRACT

In the cleaning and removal of solids from microporous hollow fibre filters by a series of chemical cleaning cycles, the optimum time and pattern of the cleaning cycles is calculated from the rate of diminution in filtrate flow rate and the time and filtrate lost in each cycle.

5 Claims, 12 Drawing Sheets

CLEANING OF HOLLOW FIBRE FILTERS

FIELD OF INVENTION

This invention relates to the cleaning and removal of solids from microporous hollow fibre filters.

BACKGROUND ART

International Patent Applications PCT/AU84/00192 and PCT/AU86/00049 describe methods for backwashing elastic microporous hollow fibre filters. In these filters, a bundle of fibres is contained in a shell or housing and the liquid to be filtered, known as the feedstock, is applied to the outside of the fibres.

During the filtering operation, which may be either to recover clarified liquid or to recover concentrated solids, some of the liquid contained in the feedstock passes through the walls of the fibres and is drawn off from the fibre lumens as filtrate.

Solids contained in the feedstock either pass out of the shell with the remainder of the feedstock carrier stream, or are retained on or in the fibres. These retained solids cause fouling and blockage of the filter.

Industrial practice with the common tube-in-shell microfilters for many years was to apply the feedstock to the inner surface of the fibres by forcing flow through the fibre lumens at such a rate that turbulence scoured the walls of the fibres, retarding blockage by solid material.

In the filter systems described in the above mentioned International Patent Applications, the feedstock is applied to the outer surface of the fibres, with a penalty of low feedstock flow velocity and low turbulence resulting in a rapid rate of blockage of the pores of the fibres.

The blockage of pores is overcome by the application of a backwashing cycle. In the first stage of the cycle, a liquid backwash is applied to the lumens of the fibres such that the liquid passes through the porous walls of the fibres and sweeps retained solids out of substantially all of the pores in the walls of the fibres. In the second stage, a gaseous backwash is applied to the lumens of the fibres such that the gas passes through the larger pores in the walls of the fibres, stretching them and dislodging retained blocking solids.

The application of the backwashing cycle discussed above restores filtrate flux to a high value that is, however, not as high as the initial value. Part of the drop in flux is due to the retention of some solids in the pores of the fibres. With each cycle this slight diminution of the flux reduces the filtration capacity of the fibres. Eventually chemical cleaning is required which is expensive and time consuming.

The need to optimise the frequency of cleaning cycles so as to maximise filtrate flow is discussed in our International Patent Application PCT/AU84/00192, where it is pointed out that it is necessary to maximise the total amount of permeate flow, and minimise the time and permeate lost in a backwash cycle.

In most cases, the filtration process is characterised by a deposition of a layer of solid material on the filter surface that then acts as a filter surface itself. This layer may be constantly changing and is known in the art as a dynamic membrane. In tube-in-shell filters, the constant change in the layer is, in part, caused by the method of application of the feed, which is to apply it in a direction of flow parallel to the fibres, known as cross-flow filtration. The layer is thus potentially being deposited and swept off at the same time.

The dynamic membrane may be unwanted, or it may be beneficial. There are cases where a filter's rejection of solid material is poor until a sufficient layer of dynamic membrane has built up on the filter to give an acceptable product. The dynamic membrane may be composed of solids from the feed, or it may be primarily composed from added filter aid materials.

When a dynamic membrane is desired, care must be taken to ensure that the backwash cleaning cycle is vigorous enough to dislodge blocking solids, but not so vigorous as to sweep away too much of the dynamic membrane. When too much of the dynamic membrane is swept away by the backwash, the filtrate must be diverted back to the feed tank until sufficient dynamic layer is built up again.

In many selective separation cases it has been found that a series of liquid-only backwashes is adequate, with an occassional gaseous backwash. The aim in these cases then, is to maximise the volume of filtrate in a given time, while at the same time ensuring that the quality of the filtrate is maintained.

DISCLOSURE OF THE INVENTION

According to one aspect of the invention there is provided a method of optimising the cleaning of a hollow fibre filter comprising the steps of:

(i) calculating from the rate of diminution of the filtrate flow rate after each application of a pressurised liquid and/or gaseous backwash cleaning cycle an equation expressing the relationship between filtrate flow and time, and, (ii) allowing for the time lost in each backwash cycle and the amount of filtrate lost in each backwash cycle, and, (iii) calculating from filtrate loss, the time loss and the relationship between filtrate flow rate and time, the optimum time of application of liquid and/or gaseous backwashes.

The invention may be modified by optimising the time for chemical cleaning either with or without the backwash optimisation by calculating from the rate of decrease of peak value of filtrate flow after each backwash cycle and the time and amount of filtrate lost in a shut down for chemical cleaning, the optimum time for shut down for chemical cleaning.

According to another aspect of the invention there is provided a method of operating a microporous hollow fibre filter which employs the optimisation techniques described above.

The invention also provides apparatus for filtering a feedstock and for automatically calculating and applying the optimal backwash cycles as described above, said apparatus comprising:

(i) means for applying a feedstock to be filtered to the outside surface of porous hollow fibres contained in a shell or housing; and for withdrawing clarified liquid or filtrate from the lumens of the fibres, (ii) means for applying through the fibre lumens liquid and gaseous backwashes that pass through the walls of the fibres, (iii) means for measuring the rate of decrease in filtrate flow rate, or flux, (iv) means for calculating the optimal backwash frequency taking account of the loss of filtrate and time involved in a backwash cycle, and, (v) means for applying the calculated optimal backwash frequency to the fibres in the filter.

The optimising method of the invention may be employed to maintain a dynamic membrane over the surfaces of the fibres. This can be achieved by allowing the filtrate to be returned to the feedstock until the dynamic membrane has built up on the fibres which will be evidenced by the quality of the filtrate. After each liquid and/or gaseous backwash step, the filtrate is returned to the feedstock until the dynamic layer has again been built up on the filters.

According to another aspect of the invention there is provided a method of cleaning a hollow fibre filter in which the fibres are subjected to a series of cleaning cycles characterised in that the cleaning cycles are applied when the integrated filtrate flux over time since the last cycle equals the instantaneous filtrate flux multiplied by the sum of the period of time elapsed since the last cleaning cycle plus the time taken for the cleaning cycle. The invention also embraces apparatus for carrying out this aspect of the invention. This relationship may be expressed mathematically as $$\int_0^T v(t) \cdot dt = (T + T_c) \cdot V(T) \quad (I)$$

where
t = time
T = a point in time measured from the last cleaning cycle,
$T_c$ = time taken to apply a backwash or cleaning cycle,
v(t) = flow rate of filtrate at any point in time t,
v(T) = flow rate of filtrate at the point in time T The derivation of this relationship is as follows:

The aim is to operate the filter at maximum average production rate, APR. APR is given by the expression $$APR = \frac{1}{T + T_c} \int_0^T v(t) \cdot dt$$

By choosing the time T at which d(APR)/dT = 0 we get $$\frac{1}{-(T + T_c)^2} \int_0^T v(t) \cdot dt + \frac{v(T)}{T + T_c} = 0$$

or $$\int_0^T v(t) \cdot dt = (T + T_c) \cdot v(T)$$

Note that the condition may be written $$\int_0^T \{v(t) - v(T)\} dt = T_c \cdot v(T)$$

and it follows that the condition may never be satisfied if $T_c$ is sufficiently large.

The invention also provides apparatus for application of the above method comprising:
(i) means for applying a feedstock to be filtered to the outside surface of porous hollow fibres contained in a shell or housing and for withdrawing filtrate from the lumens of the fibres,
(ii) means for applying through the fibre lumens liquid and gaseous backwashes that pass through the walls of the fibres,
(iii) means for measuring the volume of filtrate over a period of time,
(iv) means for determining the instantaneous filtrate flow rate at any point in time,
(v) means for determining when the volume of filtrate over a period of time equals the instantaneous filtrate flow rate multiplied by the period of time that has elapsed added to a set period of time.

The means for measuring the volume of filtrate over a period of time may conveniently be an integrating flowmeter or a programmable controller.

The invention also includes methods and apparatus that use the techniques already described but also allow for costs such as wear and tear induced by a backwash or cost of air in the backwash. Such methods and apparatus typically add a set period of time to the optimum calculated by the described methods, or increase the time by a factor.

BRIEF DESCRIPTION OF THE DRAWINGS

In order that the invention may be more readily understood and put into practical effect, reference will now be made to the accompanying drawings in which.

DESCRIPTION OF THE PREFERRED EMBODIMENT

Figure 1:
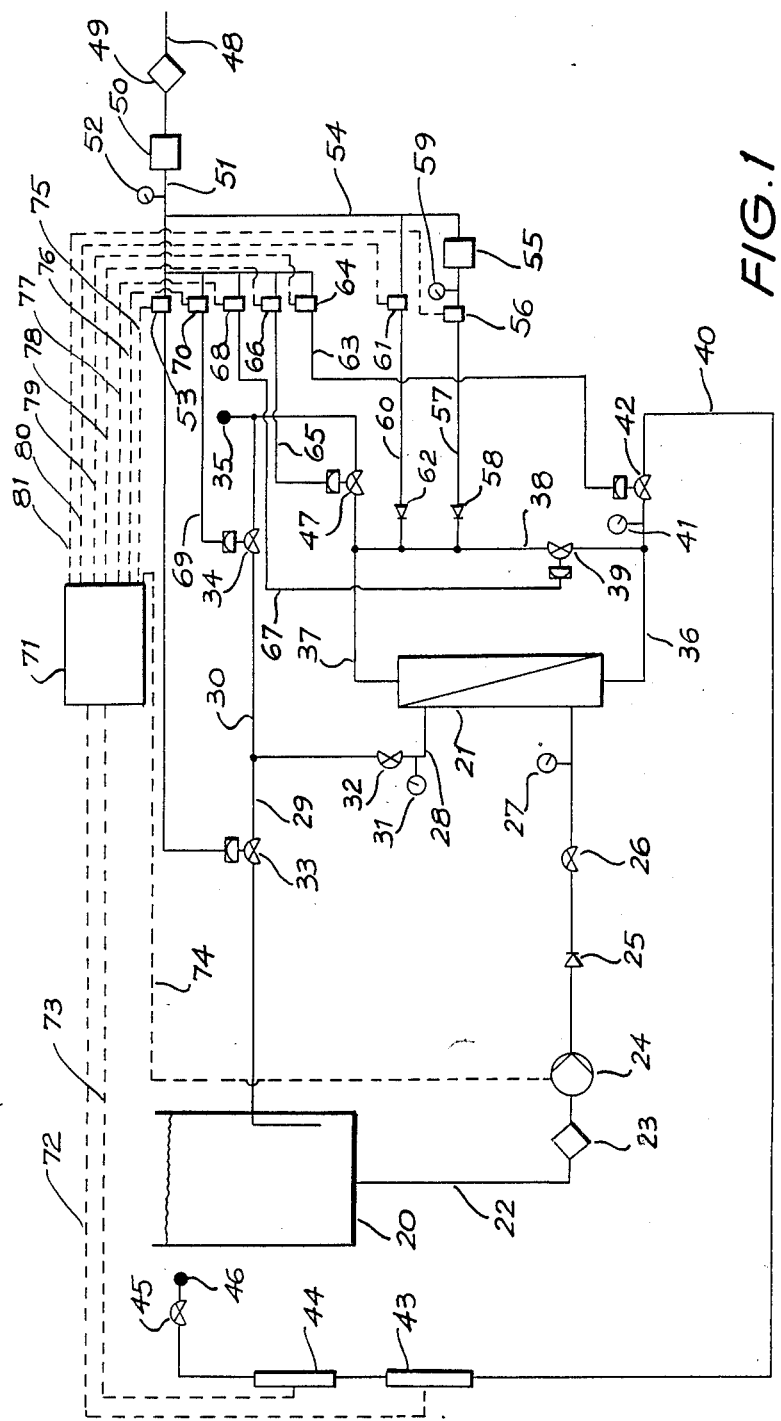
FIG. 1 is a schematic diagram of a hollow fibre filter system according to one embodiment of the invention.

In the filter system shown in FIG. 1, a feed tank 20 is connected to the feed side of a filter unit 21 by feed line 22. Feed line 22 has a strainer 23, a feed pump 24, a check valve 25, a manual valve 26 and a pressure gauge 27.

The filter unit 21 includes a cartridge or shell within which is positioned a bundle of hollow porous, polymeric fibres. In this instance, each fibre is made of polypropylene, has an average pore size of 0.2 micron, a wall thickness of 200 micron and a lumen diameter of 200 micron. There are 3,000 hollow fibres in the bundle but this number as well as the indivdiual fibre dimensions may be varied according to operational requirements. A bank of such cartridges may be used.

A concentrate discharge line 28 extends from the feed side of the hollow fibres within the filter unit 21 to the junction of concentrate return line 29 and concentrate discharge line 30. The concentrate discharge line 28 has a pressure gauge 31 and a manual valve 32.

Concentrate return line 29 delivers the concentrate through a gas-operated valve 33 to the feed tank 20. Concentrate discharge line 30 delivers concentrate through a gas-operated valve 34 to a drain discharge outlet 35.

Permeate from the lower ends of the fibre lumens is drawn off through permeate line 36 and permeate from the upper ends of the fibre lumens is drawn off through permeate line 37. Permeate lines 36 and 37 are connected by line 38 which has a gas-operated valve 39. Main permeate line 40 which has a pressure gauge 41, a gas-operated valve 42, a filtrate quality detector 43, a flowmeter 44 and a manual valve 45 delivers filtrate to filtrate discharge outlet 46.

The permeate line 37 is also connected to the drain discharge outlet 35 through a gas-operated valve 47.

The filtrate quality detector 43 may be of any convenient kind such as a turbidimeter. The flowmeter 44 may also be of convenient kind such as an intergrating flowmeter.

Pressurised gas, such as air, is supplied through line 48 to an air filter 49 and pressure regulator 50 to air supply line 51. The air supply line 51, which has a pressure gauge 52 is controlled by solenoid-operated valve 53 to provide pressurised air to the gas-operated valve 33.

Pressurised air is also delivered through line 54 to a pressure regulator 55 and solenoid operated valve 56 through line 57 and check valve 58 to permeate connection line 38. There is a pressure gauge 59 in air line 57. An air by-pass line 60 leads from air line 54 to permeate connection line 38 through a solenoid operated valve 61 and check valve 62.

A further air line 63 connects the air supply line 51 to gas-operated valve 42 in the main permeate line 40. The valve 42 is controlled by solenoid-operated valve 64 in air line 63. Air line 65 which is connected between the air supply line 51 and the gas-operated valve 47 is controlled by solenoid-operated valve 66. Air line 67 which is connected between the air supply line 51 and gas-operated valve 39 is controlled by solenoid-operated valve 68. Airline 69 which is connected between the air supply line 51 and gas-operated valve 34 is controlled by solenoid-operated valve 70.

A programmable controller 71 receives inputs from the quality meter 43 and the flowmeter 44 through lines 72 and 73 respectively. Line 74 connects the controller 71 to the feed pump 24.

Lines 75, 76, 77, 78, 79, 80 and 81 are outputs from the programmable controller 71 to solenoid-operated valves 53, 70, 68, 66, 64, 61 and 56 respectively. Thus, the gas-operated valves 33, 34, 39, 42 and 47 are controlled by the programmable controller 71 as are the gas inlet solenoid-operated valves 56 and 61 and the feed pump 24.

In filtration mode, feed from tank 20 enters filtration unit 21 through line 22. Valves 33, 39 and 42 are open and valves 34 and 47 are closed. Air supply valves 56 and 61 are also closed and feed pump 24 is on. Feed recirculation or concentrate (that is feed less filtrate) leaves the filter unit 21 through lines 28 and 29 and returns to the feed tank 20. Clarified liquid or filtrate leaves the top of the filter unit 21 through permeate line 37 and flows through line 38 to join filtrate leaving the bottom of the filter unit 21 through permeate line 36. The filtrate leaves the system via discharge outlet 46 after passing through the quality meter 43 and flowmeter 44. Manual valves 26, 32 and 45 are manipulated to give the desired line pressures.

The programmable controller 71 is continuously supplied with information as to the quality and quantity of the filtrate stream (as a function of time) by the flowmeter 44 and quality meter 43. Within the programmable controller 71 there is an optimisation routine which repeatedly maximises the filtrate flow rate within quality constraints, taking account of the time and filtrate lost in a backwash cycle. In effect, the programmable controller 71 evaluates the optimum time between gaseous or liquid backwashes, and also between chemical cleans which follow a series of backwashes. The programmable controller 71 effects the gaseous or liquid backwash by manipulation of valves 33, 39, 42, 47 and 34, air supply valves 56 and 61 and the feed pump 24.

When a dynamic layer or membrane is desired, filtrate is diverted and returned to the feed until filtrate quality is acceptable. Filtration is then commenced with filtrate collected as described above. After a backwash cycle this procedure is repeated if necessary. The loss of time and filtrate is again taken into account in optimising the choice of time for backwash.

In the preferred embodiment of the invention, as filtration is occurring, the programmable controller repeatedly calculates an equation representing the relationship between filtrate flowrate and time, and from this and stored information on the loss of time and filtrate in backwashing, calculates the optimum time for backwash. This procedure is constantly repeated with consequent refinement of the estimated time to apply a backwash until the point where backwash is to be applied is reached. After the backwash the procedure is repeated for the new cycle. The procedure is made simpler if an integrating flowmeter is used.

In another preferred embodiment, the programmable controller calculates integrated flux since the last backwash and applies a backwash when the integrated flux equals the instantaneous flux multiplied by the sum of the period of time elapsed since the last backwash plus the time taken for a backwash cycle.

The following examples illustrate the technique of the invention. In examples 1 to 4, the equation expressing the relationship between flow of filtrate, time and rate of decrease of peak filtrate flow after each liquid or gaseous backwash step was chosen to be of the form:

$$Y = \frac{100 - C}{(1 + MT^N)} + C \quad \text{(II)}$$

where
Y represents filtrate flux or flow rate
T represents time
M is a constant
N is a constant
C is a constant representing the flux after a long period of time

EXAMPLE 1

An 80 liter sample containing approximately 3.8 g/l of diatomaceous earth suspended in water was filtered by continuous recycle through a filter system similar to that shown in FIG. 1 but without the programmable controller. The system contained a single tube-in-shell cartridge containing a bundle of hollow porous fibres equivalent to approximately one square meter of filtration surface. All feed, filtrate and backwashed solids were returned to the feed tank.

Two ten minute runs were conducted in which filtrate flux rate, concentration of feed, and transmembrane pressure were measured every minute. After the apparatus had settled down, the following results were recorded (the transmembrane pressure remained substantially constant):

TABLE I

| TIME (min) | CONCENTRATION (gm/liter) | FLUX (liters/hr) | % OF MAX. FLUX |
|---|---|---|---|
| RUN 1 | | | |
| 0 | 3.71 | 990 | 100 |
| 1 | 3.54 | 930 | 93.9 |
| 2 | 3.41 | 900 | 90.0 |
| 3 | 3.29 | 880 | 88.9 |
| 4 | 3.26 | 875 | 88.4 |
| 5 | 3.14 | 850 | 85.9 |
| 6 | 3.09 | 835 | 84.3 |
| 7 | 3.11 | 825 | 83.3 |
| 8 | 3.00 | 820 | 82.8 |
| 9 | 2.97 | 800 | 80.0 |
| 10 | 2.94 | 795 | 80.3 |
| RUN 2 | | | |
| 0 | 3.59 | 1050 | 100 |
| 1 | 3.51 | 1000 | 95.2 |
| 2 | 3.38 | 975 | 92.9 |
| 3 | 3.36 | 940 | 89.5 |
| 4 | 3.32 | 925 | 88.2 |
| 5 | 3.26 | 900 | 85.7 |
| 6 | 3.21 | 880 | 83.8 |
| 7 | 3.18 | 875 | 83.3 |
| 8 | 3.21 | 865 | 82.4 |
| 9 | 3.17 | 855 | 81.4 |
| 10 | 3.15 | 850 | 80.9 |

In Run 1, the filtrate flow rate or flow decreased from 990 l/hr to 795 l/hr over a ten minute period and in Run 2 the flow rate decreased from 1050 l/hr to 850 l/hr over a similar period.

Figure 2:
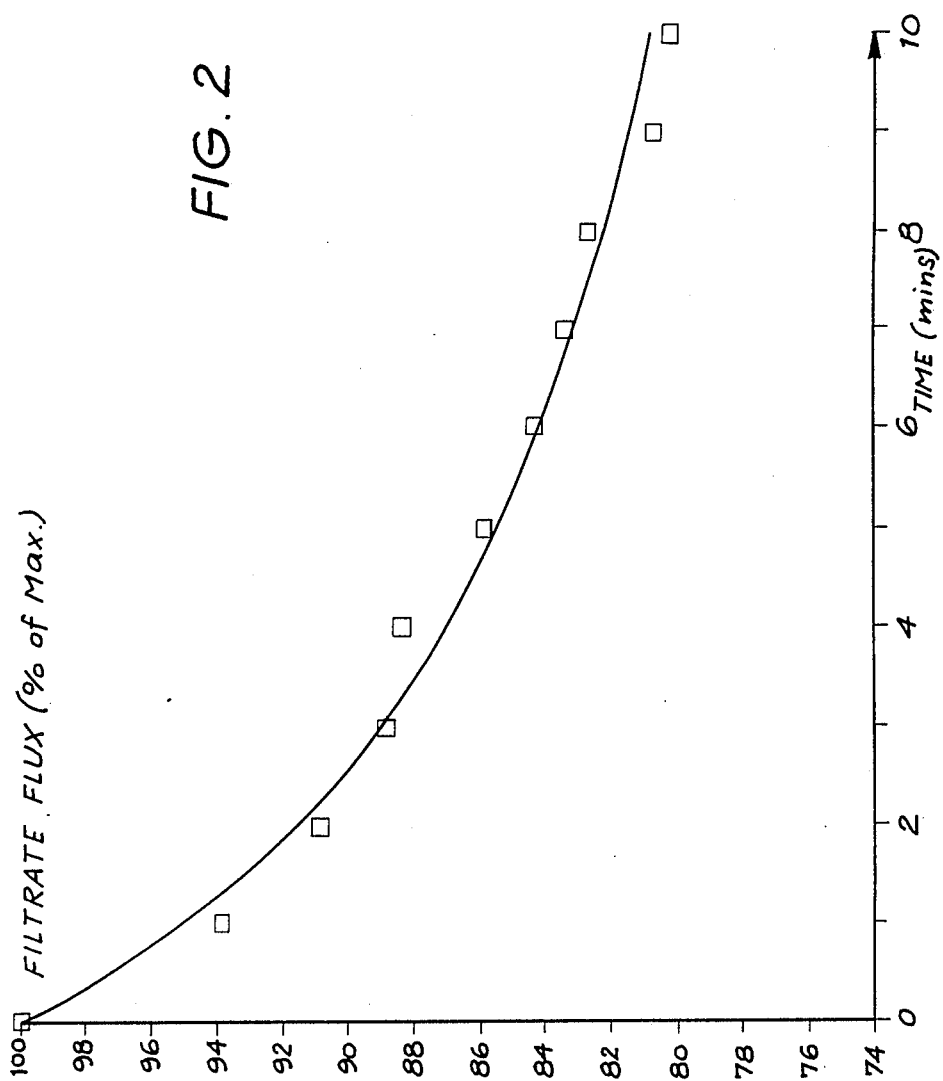
FIG. 2 is a graph of filtrate flux as a percent of maximum against time according to the theory of the present invention and showing data for one set of test results of Example 1.
Figure 3:
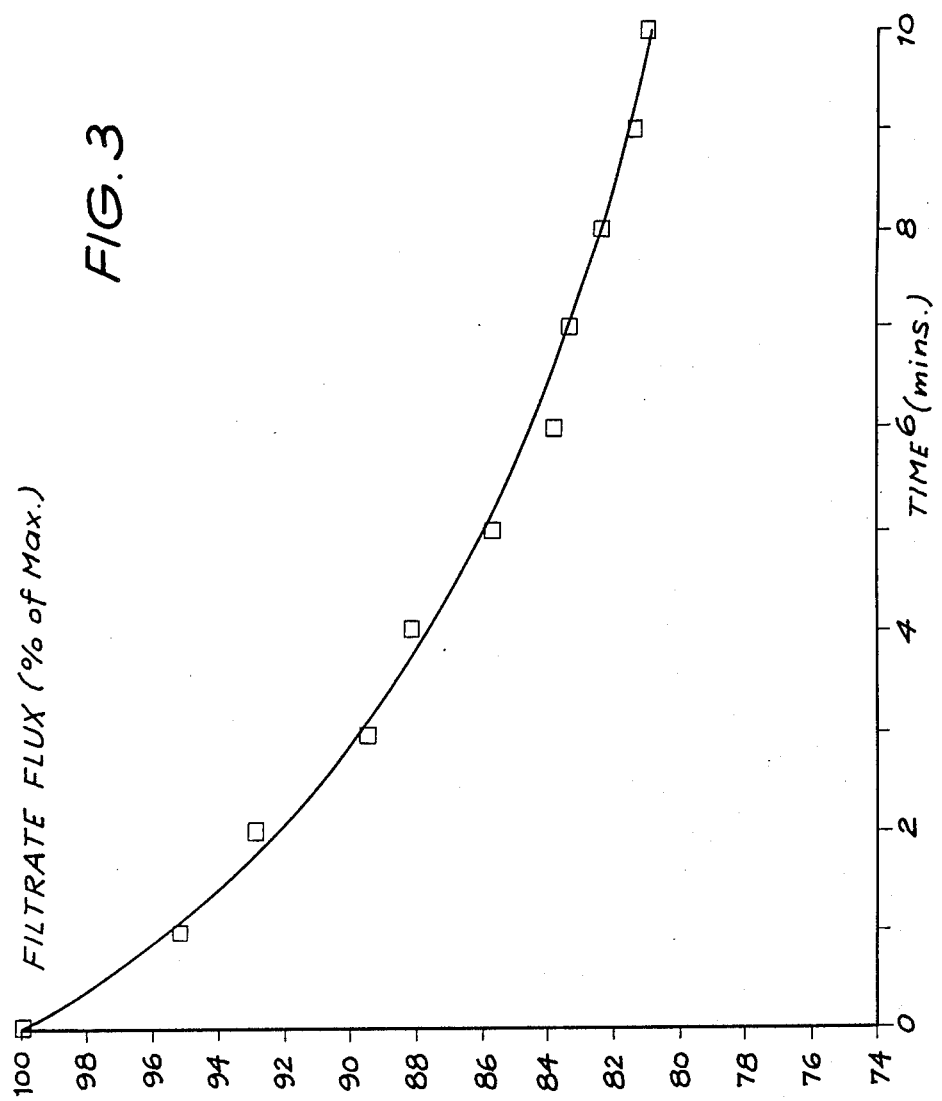
FIG. 3 is a further graph of filtrate flux as a percent of maximum against time according to the theory of the present invention and showing data for another set of test results of Example 1.

An equation (II) was fitted to the results and graphed as shown in FIGS. 2 and 3, which refer to Runs 1 and 2 respectively.

The method of fitting the theoretical curve of equation (II) to the results of Table 1 and the derivation of the constants C, M and N employed a least squares curvefit computer programme.

The constants in the equation II used to generate the theoretical curves, and the sum of squares were as follows (the standard deviations are given in brackets):

| | RUN 1 | RUN 2 |
|---|---|---|
| C | 71.959 (1.84) | 69.119 (1.34) |
| M | 12.886 (1.95) | 10.048 (0.90) |
| N | 1.0 | 1.0 |
| Sum Squares | 4.93 | 1.52 |

When a correction was made for the rapidly altering concentration (which, in this case, is a result of the limited experimental design), there was very little difference in the degree of fit of theoretical curves to the data of Table I.

The concentration correction was made as follows:
Concentration as a percentage of initial contration was calculated (K/Ko %)
These values were fitted to the equation $$K/Ko \% = \left[ \frac{(100 - k)}{(1 + jt^h)} + k \right] \quad \text{III}$$

and the constants k, j and h evaluated.
For Run 1 they were 61.3, 5.88 and 0.91
For Run 2 they were 84.0, 27.86 and 1.216

The equation for K/Ko (equation III) with the calculated values of k, j and h inserted, was then inserted into the equation $$\text{Filtrate flux} = \frac{100 - C}{(1 + M(K/Ko)t^N)} + C$$

and a curvefit run. The values of M, N and C given by this method were very little different from the values if no K/Ko correction was made.

An optimum time for air backwash was then calculated, assuming in this case that the time lost in backwash was 30 seconds. The optimum time in each run was 7 minutes.

The Basic programme for this calculation was as follows:

| PROGRAMME A |
|---|
| 10 LPRINT "OPTIMISATION OF GASEOUS BACKWASH INTERVAL TIME" |
| 20 INPUT "RUN NUMBER";R |
| 30 INPUT "M(HOUR UNITS),C(% OF INITIAL RATE)"; M,C |
| 40 LPRINT"RUN NUMBER"; R;"M=";M;"C=";C |
| 50 LPRINT "TIME (HOURS);OPTIMISED OUTPUT (LITERS/HR)" |
| 60 FOR T=0 TO ⅓STEP 1/60 |
| 70 A=(100−C)*LOG(1+M*T)/M+C*T |
| 80 P=A/(T+1/120) |
| 90 LPRINT T,P |
| 100 NEXT T |
| Note that line 70 is equivalent to A=[((100−C)*log(1+M*T)/M]+C*T |

In line 70, A equals Integrated flux at time T since $$A = \int \frac{dt}{1 + Mt} = \frac{1}{M} \log(1 + Mt)$$

In line 80, 1/120 is equivalent to a 30 second backwash expressed in hours, so P equals integrated flux divided by the sum of time elapsed since the last backwash cycle and cleaning time. Thus, P is an average production rate allowing for volume of filtrate lost during backwash, although this volume is not calculated specifically. Line 90 shows the optimum time as the point where P is a maximum.

Example 1 may also be worked by using equation (I). The basic programme for this is a follows:

| PROGRAMME B |
|---|
| 10 LPRINT "OPTIMISATION OF GASEOUS BACKWASH INTERVAL TIME" |
| 20 INPUT "RUN NUMBER";R |
| 30 INPUT "M (HOUR UNITS), C(% OF INITIAL RATE)";M,C |
| 40 LPRINT "RUN NUMBER";R;"M=";"C=";C |
| 50 LPRINT "TIME (HOURS) FOR OPTIMISED OUTPUT" |
| 60 FOR T=1 TO ⅓STEP 1/60 |
| 70 A=((100−C) *LOG(1+M*T))/M)+C*T |
| 80 B=(((100−C)/(1+M*T))+C)*(T+1/120) |
| 90 P=A−B |
| 100 LPRINT T,P |
| 110 NEXT T |

A is the integrated flux at time T and B is the instantaneous flux at time T multiplied by the sum of the time elapsed since last backwash plus the time to clean. With this approach, P is defined as equalling the integrated flux at time T (A) minus the instantaneous flux (B) so the optimum time is when P is a minimum. In Example 1 this time is 7 minutes.

EXAMPLE 2

Figure 4:
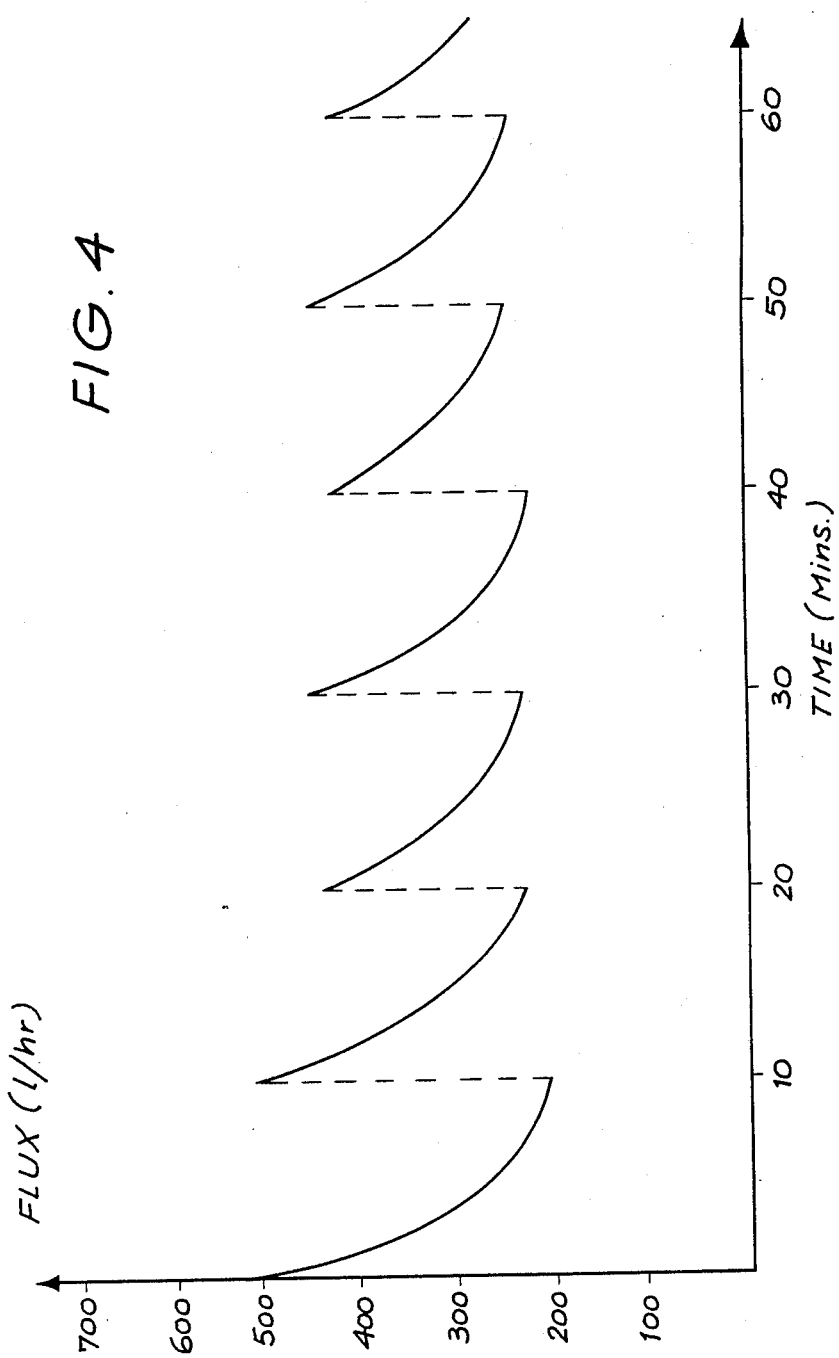
FIG. 4 is a graph of permeate flux against time over several backwash cycles for a filter system similar to that shown in FIG. 1 as detailed in Example 2, and, FIGS. 5 to 12 are graphs similar to FIGS. 2 and 3 for the data of runs 1 to 8 of Example 3.

50 g bentonite and 50 g diatomaceous earth were suspended in 20 liters of water and applied to a filter system similar to the one used in the previous Example. Air backwash was applied every 10 minutes and the flux plotted in FIG. 4. After each backwash the value to which the flux returned is shown in Table II.

TABLE II

| TIME AT BACKWASH (minutes) | FLUX (liter/hr) |
|---|---|
| 0 | 560 |
| 10 | 510 |
| 20 | 450 |
| 30 | 460 |
| 40 | 450 |
| 50 | 480 |
| 60 | 450 |

As can be seen in Table II, the peak value of filtrate flow after each backwash cycle decreased from 560 l/hr to 450 l/hr over the six backwash cycles.

Equation II above was used to generate a curve which connected the peak flow rate points, the constants were:

| C | 70.0 |
|---|---|
| M | 2.0 |
| N | 1.0 |

An optimum time for chemical cleaning was then calculated assuming that the time lost in chemical cleaning would be 1 hour.

The calculation of the optimum time for chemical cleaning is the same as for Example 1 and uses the same Basic programme but with line 60 modified to calculate the average production rate (P) over the time range 130 to 160 hours in steps of 1 hours, thus:

60 FOR T=130 TO 160 STEP 1 and with line 80 modified to reflect the one hour cleaning time, thus:

80 P=A/ (T+1)

EXAMPLE 3

199.8 g freshly precipitated ferric hydroxide were suspended in 20 l water and filtered by continuous recycle through a filter system similar to that shown in FIG. 1 without the controller. The temperature was maintained at 25±2° C. The inlet pressure was 200 KPa(g), the outlet pressure was 100 KPa(g), and the filtrate pressure varied from 0 to 45 KPa(g). The filtrate flux for eight runs is shown in Table III:

TABLE III

| Time mins | Flux l/hr | % of max flux | Time mins | Flux l/hr | % of max flux |
|---|---|---|---|---|---|
| Run 1 | | | Run 5 | | |
| 0 | 740 | 100.0 | 0 | 760 | 100.0 |
| 1 | 595 | 80.4 | 1 | 645 | 84.2 |
| 2 | 525 | 70.9 | 2 | 575 | 71.7 |
| 3 | 475 | 64.2 | 3 | 515 | 62.5 |
| 4 | 425 | 57.4 | 4 | 475 | 53.8 |
| 5 | 400 | 54.1 | 5 | 445 | 49.5 |
| 6 | 375 | 50.7 | 6 | 420 | 45.7 |
| 7 | 350 | 47.3 | 7 | 400 | 42.4 |
| 8 | 330 | 44.6 | 8 | 385 | 40.8 |
| 9 | 310 | 41.9 | 9 | 375 | 38.6 |
| 10 | 295 | 39.9 | 10 | 360 | 37.0 |
| Backwash Run 2 | | | Backwash Run 6 | | |
| 0 | 760 | 100.0 | 0 | 815 | 100.0 |
| 1 | 615 | 80.9 | 1 | 690 | 84.7 |
| 2 | 530 | 69.7 | 2 | 600 | 73.6 |
| 3 | 475 | 62.5 | 3 | 540 | 66.3 |
| 4 | 420 | 55.3 | 4 | 490 | 60.1 |
| 5 | 385 | 50.7 | 5 | 465 | 57.1 |
| 6 | 370 | 48.7 | 6 | 440 | 54.0 |
| 7 | 350 | 46.1 | 7 | 410 | 50.3 |
| 8 | 330 | 43.4 | 8 | 390 | 47.9 |
| 9 | 315 | 41.4 | 9 | 375 | 46.0 |
| 10 | 300 | 39.5 | 10 | 345 | 42.3 |
| Backwash Run 3 | | | Backwash Run 7 | | |
| 0 | 750 | 100.0 | 0 | 810 | 100.0 |
| 1 | 630 | 84.0 | 1 | 695 | 85.8 |
| 2 | 550 | 73.3 | 2 | 605 | 74.7 |
| 3 | 495 | 66.0 | 3 | 540 | 66.7 |
| 4 | 450 | 60.0 | 4 | 500 | 61.7 |
| 5 | 430 | 57.3 | 5 | 460 | 56.8 |
| 6 | 400 | 53.3 | 6 | 440 | 54.3 |
| 7 | 390 | 52.0 | 7 | 415 | 51.2 |
| 8 | 365 | 48.7 | 8 | 395 | 48.8 |
| 9 | 350 | 46.7 | 9 | 380 | 46.9 |
| 10 | 330 | 44.0 | 10 | 360 | 44.4 |
| Backwash Run 4 | | | Backwash Run 8 | | |
| 0 | 760 | 100.0 | 0 | 830 | 100.0 |
| 1 | 645 | 84.9 | 1 | 700 | 84.3 |
| 2 | 580 | 76.3 | 2 | 600 | 72.3 |
| 3 | 525 | 69.1 | 3 | 540 | 65.1 |
| 4 | 485 | 63.8 | 4 | 495 | 59.6 |
| 5 | 460 | 60.5 | 5 | 460 | 55.4 |
| 6 | 430 | 56.6 | 6 | 435 | 52.4 |
| 7 | 410 | 53.9 | 7 | 410 | 49.4 |
| 8 | 395 | 52.0 | 8 | 390 | 47.0 |
| 9 | 375 | 49.3 | 9 | 375 | 45.2 |
| 10 | 360 | 47.4 | 10 | 360 | 43.4 |
| Backwash | | | End | | |

Figure 5:
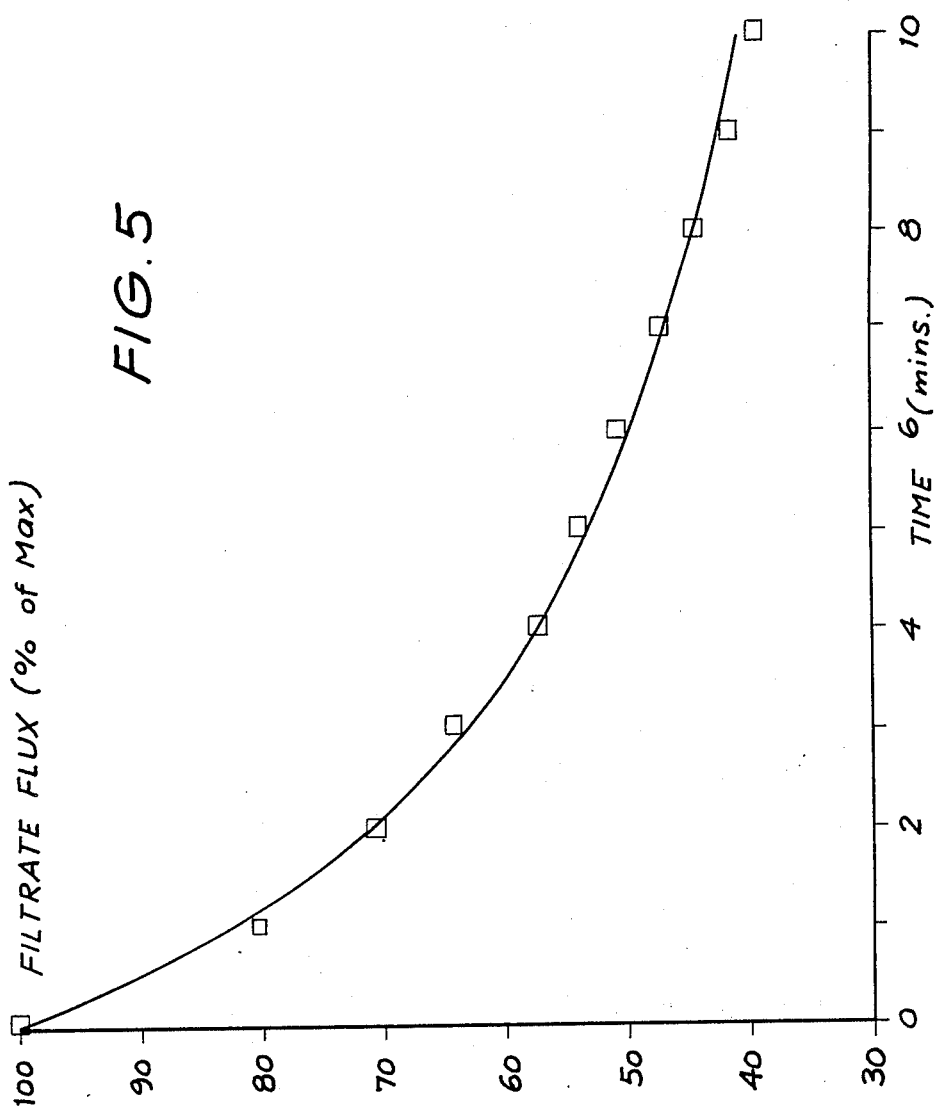
Figure 6:
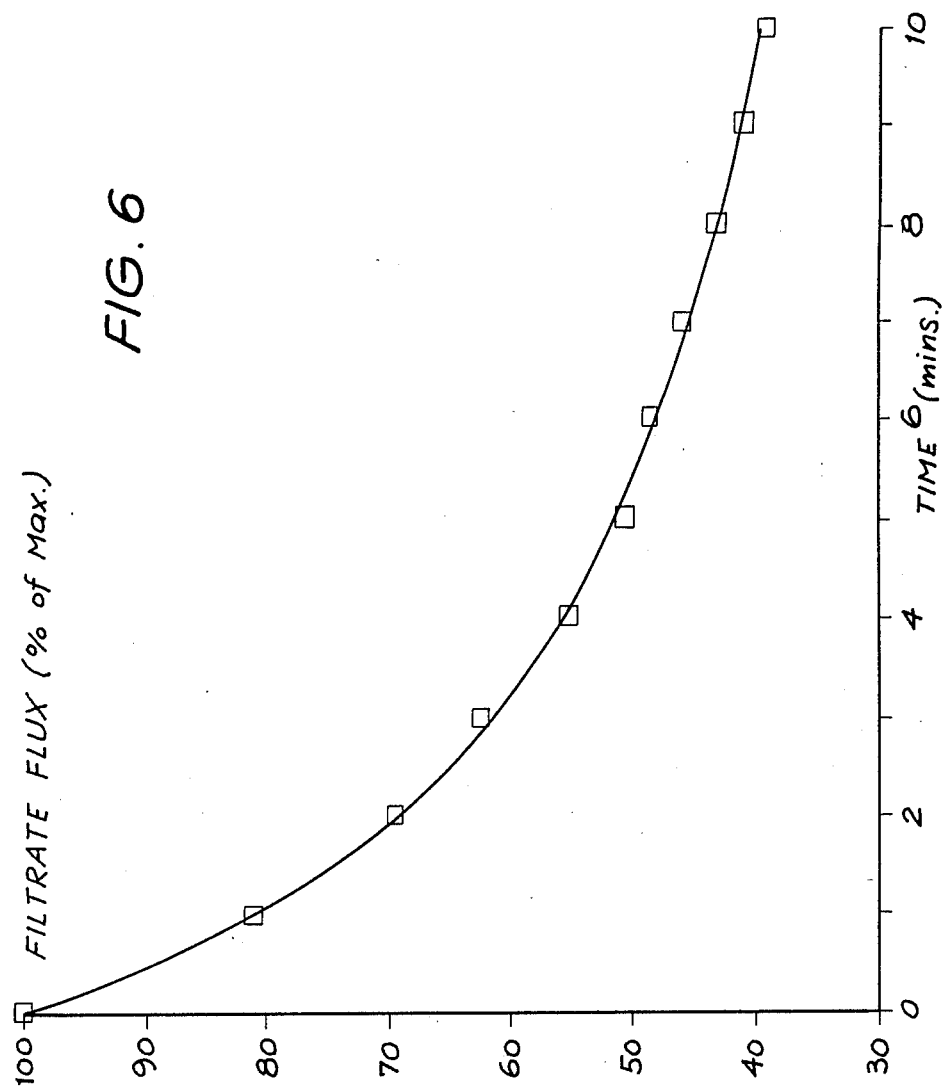
Figure 7:
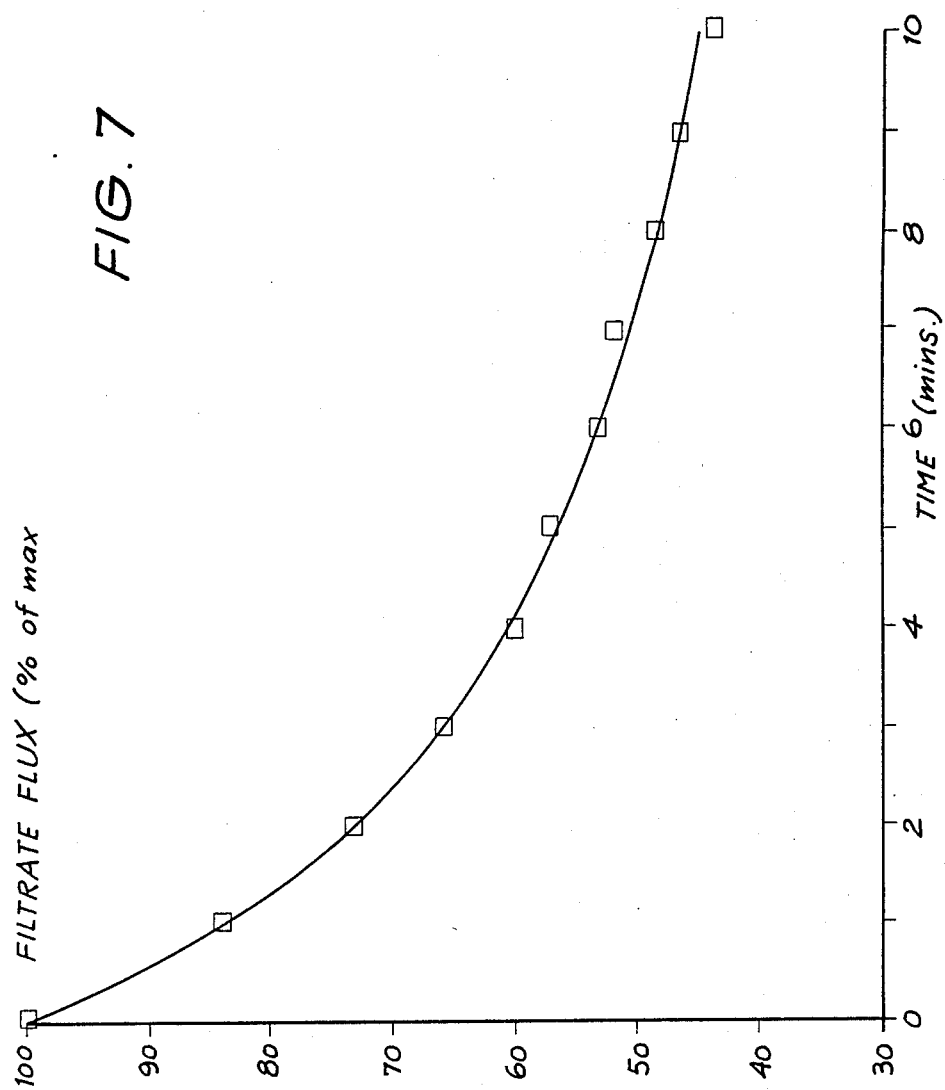
Figure 8:
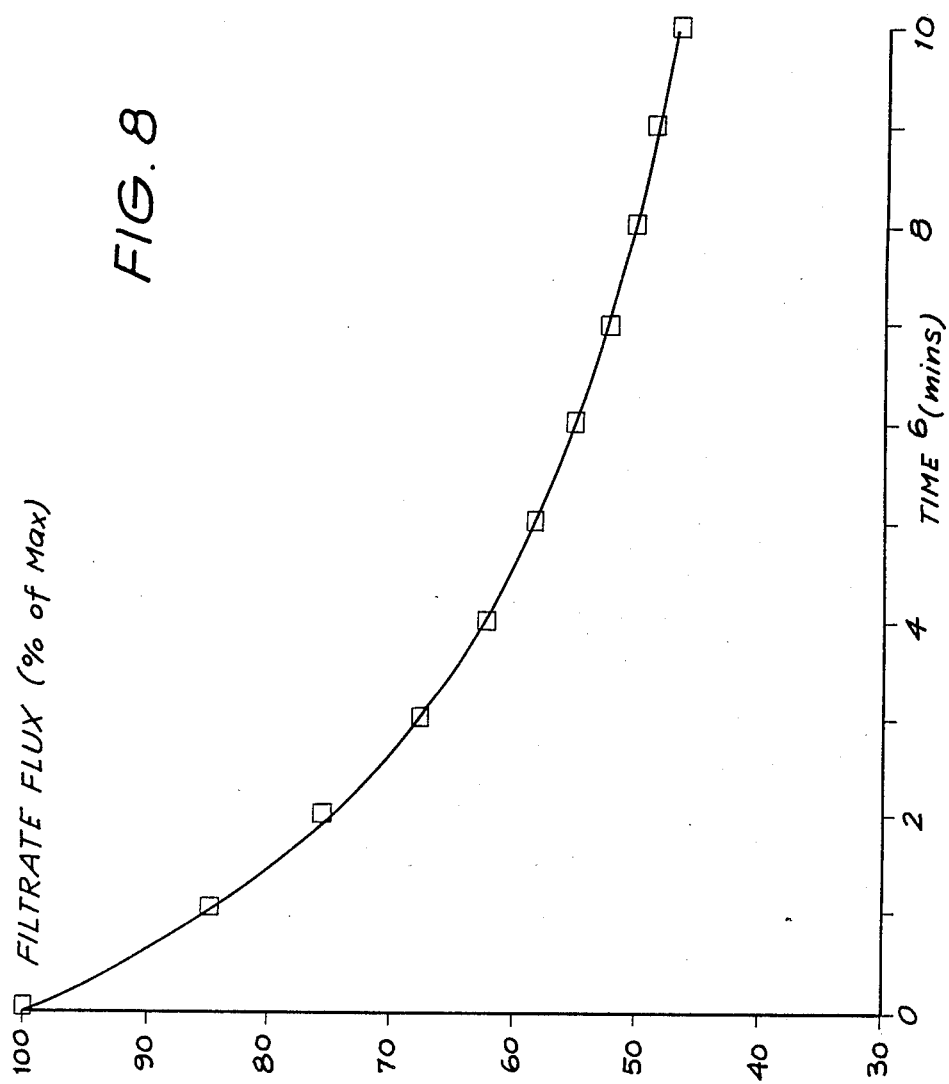
Figure 9:
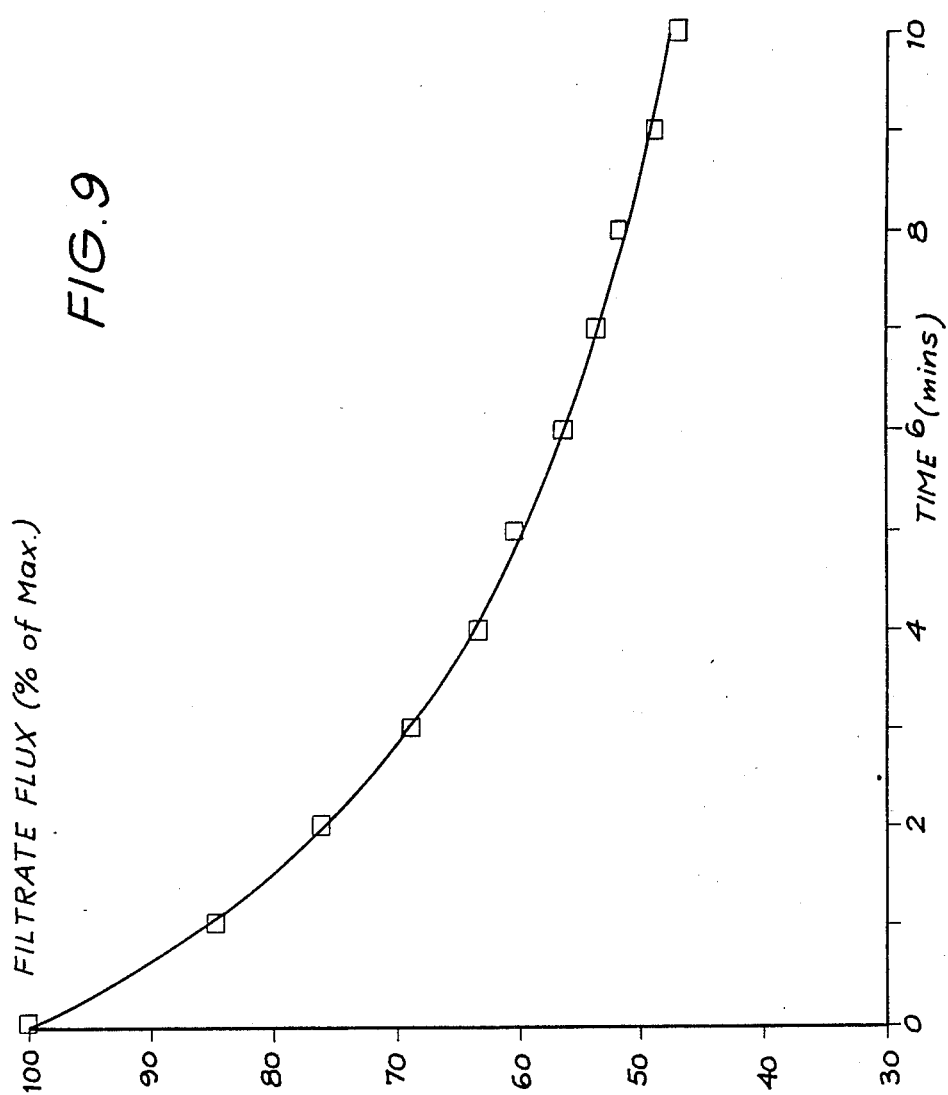
Figure 10:
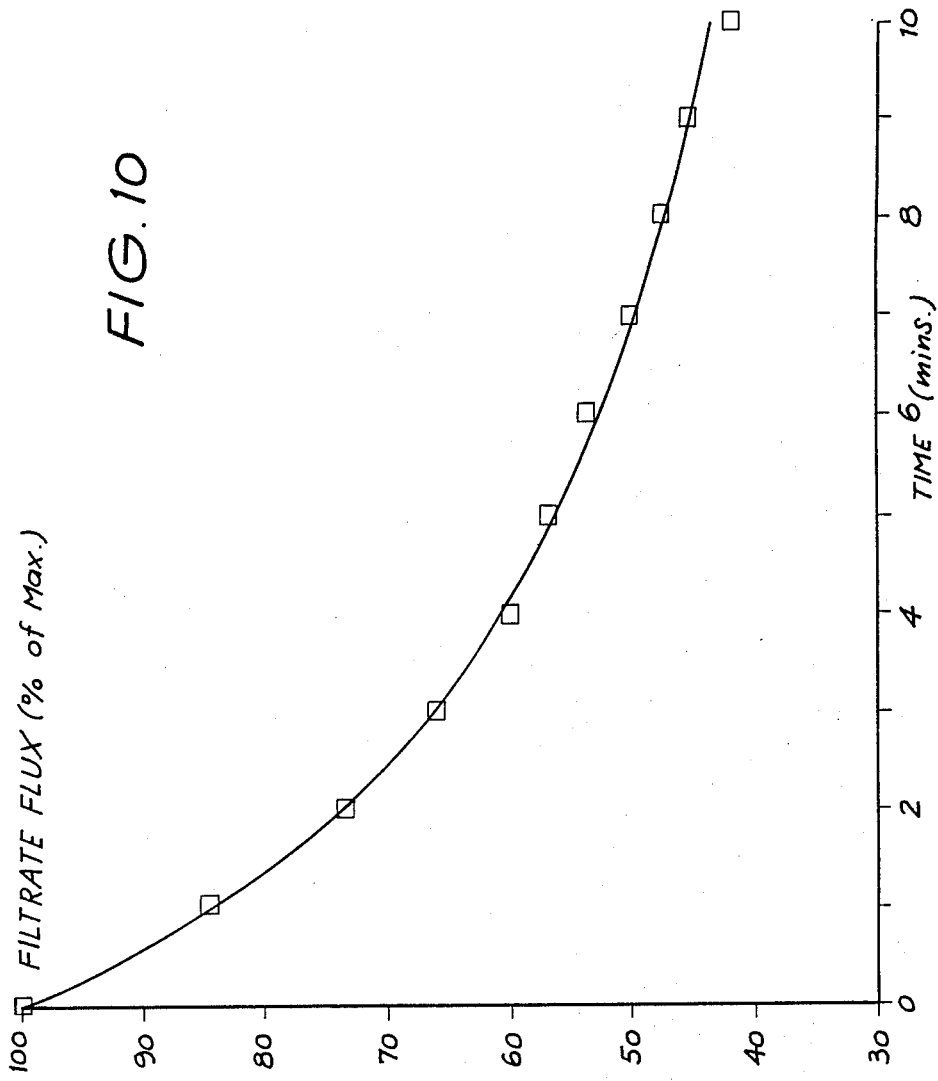
Figure 11:
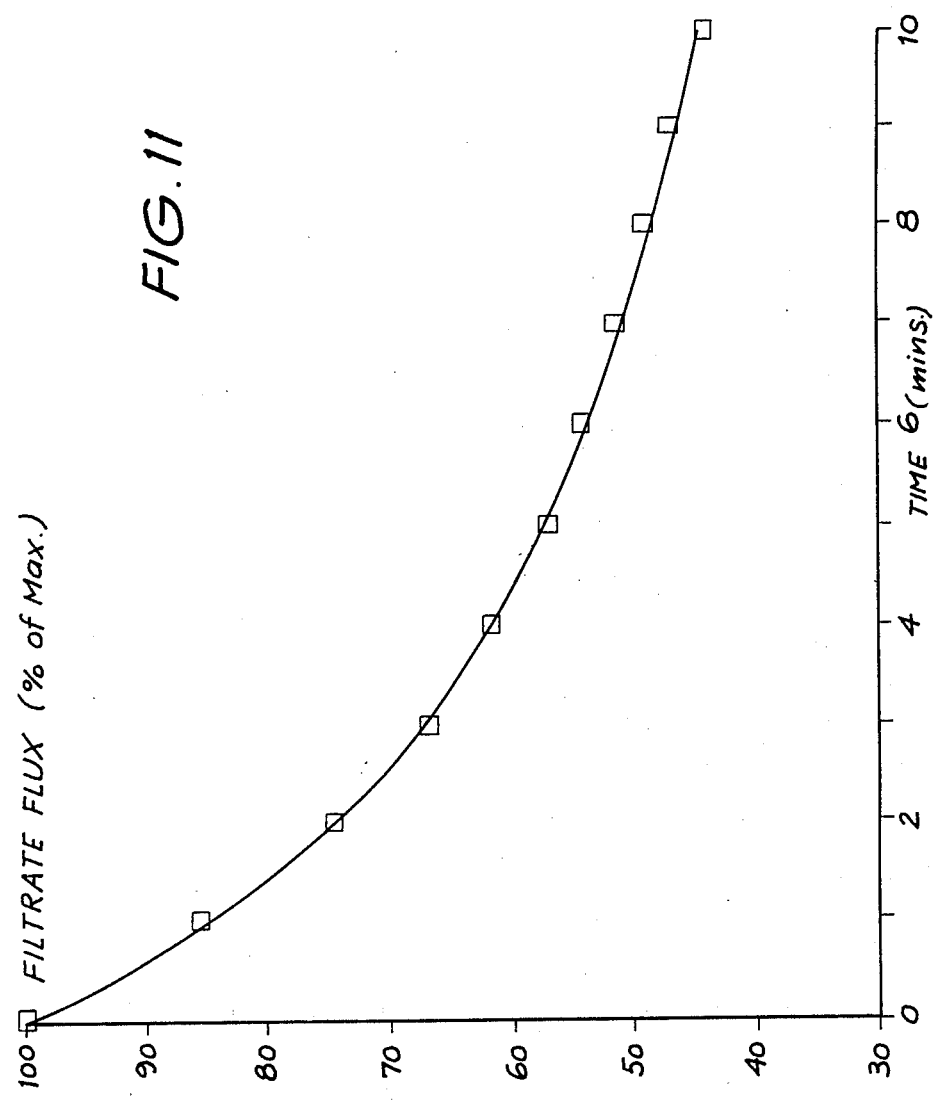
Figure 12:
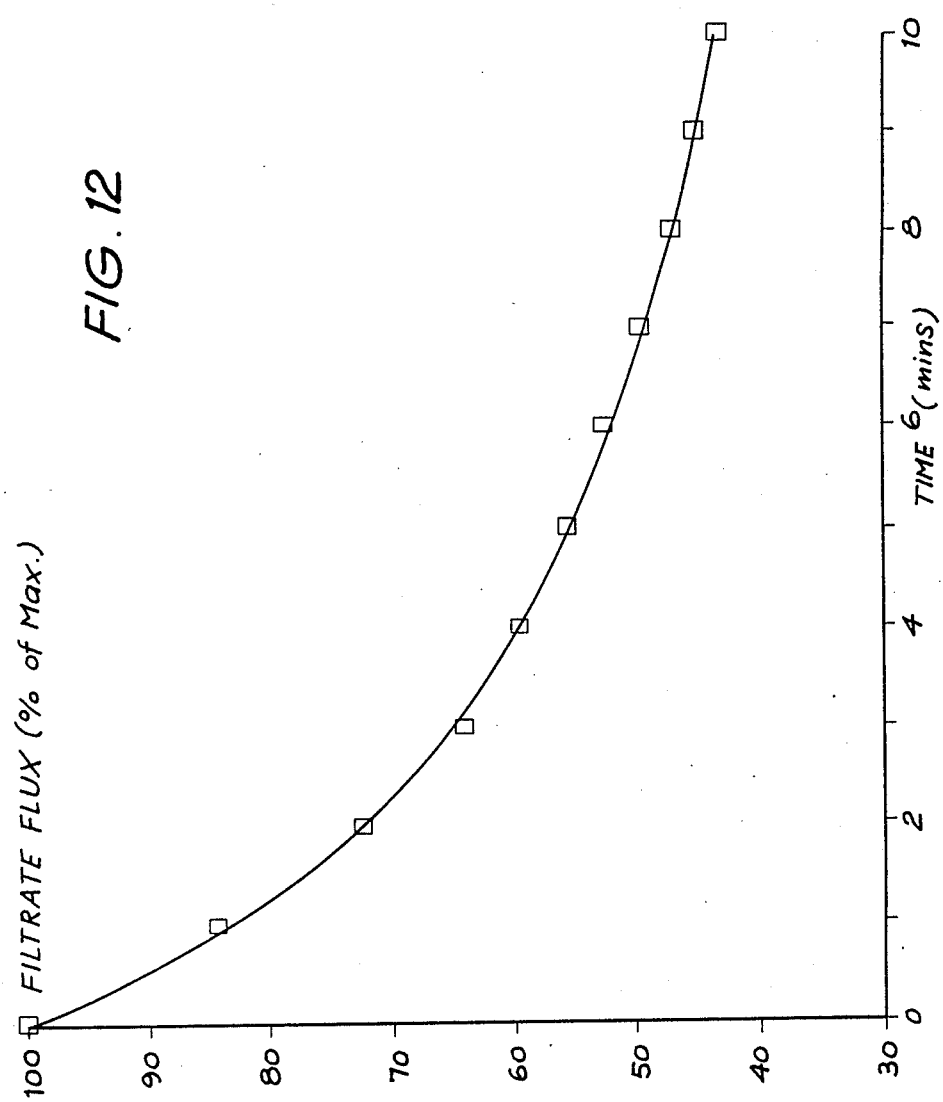

An equation (II) was fitted to the results and graphed as shown in FIGS. 5 to 12, where FIG. 5 corresponds to Run 1, FIG. 6 to Run 2, and so on up to FIG. 12 which corresponds to Run 8.

The constants used to generate the curves are as shown in the following Table where the standard deviations are given in brackets. N was very near to 1 in each case and so was taken as 1 in later calculations.

| Run No. | M | C | Sum of Squares Residual |
|---|---|---|---|
| 1 | 17.0 (1.0) | 20.0 (1.8) | 8.39 |
| 2 | 18.6 (0.6) | 20.4 (1.0) | 2.75 |
| 3 | 16.4 (0.7) | 25.0 (1.3) | 3.95 |
| 4 | 14.4 (0.5) | 26.2 (1.0) | 1.91 |
| 5 | 15.6 (0.4) | 27.1 (0.7) | 0.94 |
| 6 | 14.5 (0.7) | 20.6 (1.7) | 5.03 |
| 7 | 14.3 (0.5) | 21.6 (1.1) | 2.06 |
| 8 | 16.7 (0.6) | 23.3 (1.0) | 2.24 |

Calculation of the optimum time for backwash for each of the runs (assuming the time lost in backwash was 30 seconds and taking account of filtrate lost using programmes A and B gave the following results:

| | OPTIMUM TIME | |
|---|---|---|
| RUN | PROGRAMME B | PROGRAMME A |
| 1 | 2.5 | 2.5 |

-continued

| | OPTIMUM TIME | |
|---|---|---|
| RUN | PROGRAMME B | PROGRAMME A |
| 2 | 2.5 | 2.5 |
| 3 | 2.5 | 3 |
| 4 | 2.5 | 3 |
| 5 | 2.5 | 3 |
| 6 | 2.5 | 2.5 |
| 7 | 2.5 | 3 |
| 8 | 2.5 | 2.5 |

EXAMPLE 4

A suspension of 50 g diatomite and 50 g bentonite in 20 l water was filtered as in Example 3. The temperature was maintained at 25±2° C. The inlet pressure was 200 KPa(g), the outlet pressure was 100 KPa(g), and the filtrate pressure varied between 10 and 50 KPa(g). The filtrate flux for twelve runs is shown in Table IV.

TABLE IV

| Time mins | Flux l/hr | % of max flux | Time mins | Flux l/hr | % of max flux |
|---|---|---|---|---|---|
| Run 1 | | | Run 2 | | |
| 0 | 850 | 100.0 | 0 | 840 | 100.0 |
| 1 | 710 | 80.7 | 1 | 695 | 83.1 |
| 2 | 630 | 69.9 | 2 | 600 | 72.3 |
| 3 | 550 | 63.3 | 3 | 545 | 65.1 |
| 4 | 510 | 59.0 | 4 | 505 | 60.8 |
| 5 | 480 | 55.4 | 5 | 480 | 57.8 |
| 6 | 460 | 53.6 | 6 | 460 | 55.4 |
| 7 | 445 | 51.8 | 7 | 445 | 53.6 |
| 8 | 435 | 50.6 | 8 | 430 | 51.8 |
| 9 | 425 | 49.4 | 9 | 425 | 51.2 |
| 10 | 420 | 48.2 | 10 | 420 | 50.6 |
| Backwash | | | | | |
| Run 3 | | | Run 4 | | |
| 0 | 830 | 100.0 | 0 | 830 | 100.0 |
| 1 | 670 | 80.7 | 1 | 690 | 83.1 |
| 2 | 580 | 69.9 | 2 | 600 | 72.3 |
| 3 | 525 | 63.3 | 3 | 540 | 65.1 |
| 4 | 490 | 59.0 | 4 | 505 | 60.8 |
| 5 | 460 | 55.4 | 5 | 480 | 57.8 |
| 6 | 445 | 53.6 | 6 | 460 | 55.4 |
| 7 | 430 | 51.8 | 7 | 445 | 53.4 |
| 8 | 420 | 50.6 | 8 | 430 | 51.8 |
| 9 | 410 | 49.4 | 9 | 425 | 51.2 |
| 10 | 400 | 48.2 | 10 | 420 | 50.6 |
| Backwash | | | Backwash | | |
| Run 5 | | | Run 6 | | |
| 0 | 850 | 100.0 | 0 | 800 | 100.0 |
| 1 | 695 | 81.8 | 1 | 670 | 83.8 |
| 2 | 610 | 71.8 | 2 | 580 | 72.5 |
| 3 | 550 | 64.7 | 3 | 520 | 65.0 |
| 4 | 510 | 60.0 | 4 | 490 | 61.3 |
| 5 | 485 | 57.1 | 5 | 460 | 57.5 |
| 6 | 465 | 54.7 | 6 | 445 | 55.6 |
| 7 | 450 | 52.9 | 7 | 430 | 53.8 |
| 8 | 440 | 51.8 | 8 | 420 | 52.5 |
| 9 | 430 | 50.6 | 9 | 410 | 51.3 |
| 10 | 425 | 50.0 | 10 | 405 | 50.6 |
| Backwash | | | Backwash | | |
| Run 7 | | | Run 8 | | |
| 0 | 780 | 100.0 | 0 | 750 | 100.0 |
| 1 | 670 | 85.9 | 1 | 650 | 86.7 |
| 2 | 575 | 73.7 | 2 | 565 | 75.3 |
| 3 | 520 | 66.7 | 3 | 520 | 69.3 |
| 4 | 480 | 61.5 | 4 | 480 | 64.0 |
| 5 | 460 | 59.0 | 5 | 455 | 60.7 |
| 6 | 445 | 57.1 | 6 | 440 | 58.7 |
| 7 | 430 | 55.1 | 7 | 430 | 57.3 |
| 8 | 425 | 54.5 | 8 | 420 | 56.0 |
| 9 | 415 | 53.2 | 9 | 410 | 54.7 |
| 10 | 410 | 52.6 | 10 | 405 | 54.0 |
| Backwash | | | Backwash | | |
| Run 9 | | | Run 10 | | |
| 0 | 850 | 100.0 | 0 | 820 | 100.0 |
| 1 | 680 | 80.0 | 1 | 670 | 81.7 |

TABLE IV-continued

| Time mins | Flux l/hr | % of max flux | Time mins | Flux l/hr | % of max flux |
|---|---|---|---|---|---|
| 2 | 585 | 68.8 | 2 | 575 | 70.1 |
| 3 | 530 | 62.4 | 3 | 520 | 63.4 |
| 4 | 490 | 57.6 | 4 | 480 | 58.5 |
| 5 | 470 | 55.3 | 5 | 460 | 56.1 |
| 6 | 450 | 52.9 | 6 | 440 | 53.7 |
| 7 | 430 | 50.6 | 7 | 430 | 52.4 |
| 8 | 420 | 49.4 | 8 | 415 | 50.6 |
| 9 | 410 | 48.2 | 9 | 405 | 49.4 |
| 10 | 400 | 47.1 | 10 | 400 | 48.8 |
| Backwash | | | Backwash | | |
| Run 11 | | | Run 12 | | |
| 0 | 800 | 100.0 | 0 | 800 | 100.0 |
| 1 | 650 | 81.3 | 1 | 650 | 81.3 |
| 2 | 565 | 70.6 | 2 | 560 | 70.0 |
| 3 | 500 | 62.5 | 3 | 500 | 62.5 |
| 4 | 470 | 58.8 | 4 | 480 | 60.0 |
| 5 | 450 | 56.3 | 5 | 445 | 55.6 |
| 6 | 435 | 54.4 | 6 | 430 | 53.8 |
| 7 | 420 | 52.5 | 7 | 420 | 52.5 |
| 8 | 410 | 51.3 | 8 | 410 | 51.3 |
| 9 | 400 | 50.0 | 9 | 400 | 50.0 |
| 10 | 395 | 49.4 | 10 | 395 | 49.4 |
| Backwash | | | End | | |

The constants generated as in earlier Examples are as shown in the following Table where the standard deviations are given in brackets:

| Run No. | M | C | N | Sum of Squares Residual |
|---|---|---|---|---|
| 1 | 65.1 (20.2) | 41.5 (1.7) | 1.27 (0.08) | 3.560 |
| 2 | 52.9 (5.7) | 41.8 (0.6) | 1.18 (0.03) | 0.387 |
| 3 | 39.9 (3.7) | 39.3 (0.6) | 1.09 (0.02) | 0.273 |
| 4 | 53.4 (5.9) | 42.5 (0.6) | 1.19 (0.03) | 0.408 |
| 5 | 43.6 (5.9) | 41.1 (0.8) | 1.12 (0.03) | 0.589 |
| 6 | 66.9 (7.8) | 43.7 (0.6) | 1.25 (0.03) | 0.460 |
| 7 | 137.3 (16.8) | 48.1 (0.4) | 1.44 (0.03) | 0.482 |
| 8 | 82.7 (12.6) | 47.9 (0.7) | 1.34 (0.04) | 0.716 |
| 9 | 35.1 (4.5) | 37.4 (0.9) | 1.05 (0.03) | 0.541 |
| 10 | 58.3 (7.1) | 41.5 (0.6) | 1.18 (0.03) | 0.493 |
| 11 | 65.6 (13.3) | 48.9 (1.0) | 1.20 (0.05) | 1.323 |
| 12 | 62.3 (15.2) | 42.6 (1.2) | 1.19 (0.06) | 1.908 |

The optimum time for backwash (assuming the time lost in a backwash was 30 seconds and taking accounts of the amount of filtrate lost) was calculated using the following programme:

| PROGRAMME C |
|---|
| 10 LPRINT "OPTIMISATION OF GASEOUS BACK-WASH INTERVAL TIME" |
| 20 INPUT "RUN NUMBER";R |
| 30 INPUT "M(HOUR UNITS), C(% OF INITIAL RATE), N";M,C,N |
| 40 LPRINT "RUN NUMBER";R;"M=";M;"C=";C;"N=";N |
| 50 LPRINT "TIME (HOURS) FOR OPTIMISED OUTPUT" |
| 60 Y=0 |
| 70 FOR T=0 TO ½ STEP 1/720 |
| 80 A=((100−C)/(1+(M*(T N))))+C |
| 90 B=((100−C)/(1+M*((T+1/720) N)))+C |
| 100 Y=Y+((A+B)/1440) |
| 110 P=Y/(T+1/120) |
| 120 IF (720*T) MOD (120*T) = 0 THEN 130 ELSE 140 |
| 130 LPRINT T,P |
| 140 NEXT T |

The optimum time for backwash for each run is shown in Table V.

TABLE V

| RUN | OPTIMUM TIME (minutes) | RUN | OPTIMUM TIME (minutes) |
|---|---|---|---|
| 1 | 2 | 7 | 2 |
| 2 | 2 | 8 | 2.25 |
| 3 | 2 | 9 | 2 |
| 4 | 2 | 10 | 2 |
| 5 | 2 | 11 | 2.5 |
| 6 | 2 | 12 | 2 |

EXAMPLE 5

1300 g TiO$_2$ suspended in 30 l water at 50° C. were filtered using an apparatus similar to that in FIG. 1 where the programmable controller calculated when integrated flux equalled instantaneous flux multiplied by the sum of the period of time elapsed since the last backwash plus the time taken for a cleaning backwash cycle. In this case the backwash cycle took one minute. The feed inlet pressure was 200 kPa, the feed outlet 90 kPa, and the filtrate backpressure was zero.

The filtration was then performed using the optimum time and then times greater than and less than the optimum time as follows:
  (i) the controller selected an optimum time between backwashes of approximately 80 seconds. The average production rate was 423 l/hr.
  (ii) the filtration was performed with a 6 minute (manually set) interval between backwashes. The average production rate was 271 l/hr.
  (iii) the filtration was performed with a 25 second (manually set) interval between backwashes. The average production rate was 279 l/hr.

It can be seen from this Example that where flux falls off rapidly, the correct timing between backwashes can make a large difference to the efficiency of the filtration.

EXAMPLE 6

300 g Ca(OH)$_2$ in 30 l water at 50° C. were filtered in an experiment similar to Example 5. The feed inlet pressure was 150 kPa, the feed outlet 90 kPa, and the filtrate backpressure zero. Time lost for backwash was 1 minute.

The filtration was performed using the optimum time and then using times greater and less than the optimum time as follows:
  (i) the controller selected an optimum time between backwashes of approximately 5 minutes The average production rate was 1097 l/hr.
  (ii) the filtration was performed with a 10 minute (manually set) interval between backwashes. The average production rate was 1056 l/hr.
  (iii) the filtration was performed with a 100 second (manually set) interval between backwashes. The average production rate was 946 l/hr.

Various modifications may be made in details of design, construction and mode of operation without departing from the scope and ambit of the invention. For example, the methods and apparatus of the invention may take account of other factors such as the cost of the cleaning gas and wear and tear on the filter unit. Thus, the optimum time for backwashing to achieve maximum average flux may be extended to take account of such factors.

We claim:

1. A method of operating a microporous hollow fibre filter comprising the steps of:
   (i) applying a liquid feedstock to be filtered to the outer surface of the filters whereby:
      (a) some of the liquid passes through the walls of the fibres to be drawn off as clarified liquid or filtrate from the fibre lumens,
      (b) at least some of the solids are retained on or in the fibres with the non-retained solids being removed from the filter with the remainder of the liquid
   (ii) discharging the retained solids by applying a pressurised liquid and/or gas backwash,
   (iii) calculating from the rate of diminution of flow of filtrate after each application of pressurised liquid and/or gaseous backwash an equation expressing the relationship between filtrate flow and time, and,
   (iv) allowing for the time lost in each backwash cycle and the amount of filtrate lost in each backwash cycle,
   (v) calculating from the filtrate loss, the time loss and the the relationship between filtrate flow and time, the optimum time and pattern of application of sequential liquid or gaseous backwashes, and,
   (vi) effecting the backwash at the optimum time.

2. A method according to claim 1 and including the steps of implementing a chemical cleaning of the fibres after a series of backwashes and calculating from the rate of decrease of peak value of filtrate flow after each backwash cycle and the amount of time and filtrate lost in chemical cleaning, the optimum time for shut down for chemical cleaning.

3. Apparatus for filtering a feedstock and for carrying out a predetermined frequency of liquid and/or gaseous backwashes of the filtering apparatus comprising:
   (i) means for applying a feedstock to be filtered to the outside surface of porous hollow fibres contained in a shell or housing, and for withdrawing clarified liquid or filtrate from the lumens of the fibres,
   (ii) means for applying through the fibre lumens liquid and/or gaseous backwashes that pass through the walls of the fibres,
   (iii) means for measuring the rate of decrease in filtrate flow rate,
   (iv) means for calculating the optimal backwash frequency taking account of the rate of decrease in filtrate flow rate, loss of filtrate and time involved in a backwash cycle, and,
   (v) means for applying the calculated optimal backwash frequency to the fibres in the filter.

4. Apparatus for automatically applying a predetermined pattern of sequential liquid and gaseous backwashes whilst maintaining a dynamic membrane layer on the surface of the filter fibres, as described above said apparatus comprising:
   (i) means for applying a feedstock to be filtered to the outside surface of porous hollow fibres contained in a shell or housing and for withdrawing filtrate from the lumens of the fibres,
   (ii) means for applying through the fibre lumens liquid and gaseous backwashes that pass through the walls of the fibres,
   (iii) means for automatically applying the predetermined backwash pattern to the fibres in the filter,
   (iv) means for detecting the quality of the filtrate and redirecting it back to the feedstock if the quality is unacceptable,
   (v) means for measuring the rate of decrease in filtrate flow rate, or flux, (vi) means for calculating the optimal backwash frequency taking account of the loss of filtrate and time involved in a backwash cycle, and, (vii) means for applying the calculated optimal backwash frequency to the fibres in the filter.

5. Apparatus for filtering a feedstock and for carrying out liquid and/or gaseous backwash cycles, said apparatus comprising:

(i) means for applying a feedstock to be filtered to the outside surface of porous hollow fibres contained in a shell or housing, and for withdrawing clarified liquid or filtrate from the lumens of the fibres, (ii) means for applying through the fibre lumens liquid and/or gaseous backwashes that pass through the walls of the fibres, (iii) means for determining the instantaneous filtrate flow rate at any point in time, (iv) means for measuring the integrated filtrate flux over time since the last backwash or chemical cleaning cycle, (v) means for applying a backwash cycle to the fibres when the integrated filtrate flux equals the instantaneous filtrate flux multiplied by the sum of the period of time elapsed since the last backwash plus the time taken for the backwash cycle.

* * * * *